(12) United States Patent
Sun (10) Patent No.: US 10,162,978 B2
(45) Date of Patent: Dec. 25, 2018

(54) SECURE COMPUTER CLUSTER WITH ENCRYPTION

(71) Applicant: MasterCard International Incorporated, Purchase, NY (US)

(72) Inventor: Tiangong Sun, Chesterfield, MO (US)

(73) Assignee: MasterCard International Incorporated, Purchase, NY (US)

( * ) Notice: Subject to any disclaimer, the term of this patent is extended or adjusted under 35 U.S.C. 154(b) by 16 days.

(21) Appl. No.: 14/861,039

(22) Filed: Sep. 22, 2015

(65) Prior Publication Data

US 2017/0083716 A1 Mar. 23, 2017

(51) Int. Cl.
| | |
|---|---|
| G06F 21/62 | (2013.01) |
| H04L 9/08 | (2006.01) |
| H04L 9/14 | (2006.01) |
| H04L 29/06 | (2006.01) |
| G06F 21/60 | (2013.01) |

(52) U.S. Cl.
CPC ........ *G06F 21/6218* (2013.01); *G06F 21/602* (2013.01); *H04L 9/083* (2013.01); *H04L 9/0822* (2013.01); *H04L 9/14* (2013.01); *H04L 63/062* (2013.01); *H04L 2463/062* (2013.01)

(58) Field of Classification Search
CPC .............. G06F 21/6218; G06F 21/602; H04L 9/0822; H04L 9/083; H04L 9/14; H04L 63/062
See application file for complete search history.

(56) References Cited

U.S. PATENT DOCUMENTS

| | | | |
|---|---|---|---|
| 5,495,533 A | 2/1996 | Linehan et al. | |
| 8,769,644 B1 * | 7/2014 | Eicken | H04L 67/1097 709/225 |
| 9,172,608 B2 * | 10/2015 | Zeyliger | G06F 9/44505 |

(Continued)

FOREIGN PATENT DOCUMENTS

WO 199914652 A1 3/1999

OTHER PUBLICATIONS

Patent Cooperation Treaty, International Search Report for PCT/US2016/051598, dated Dec. 20. 2016, pp. 1-3.

*Primary Examiner* — Saleh Najjar
*Assistant Examiner* — Louis C Teng
(74) *Attorney, Agent, or Firm* — Sheppard Mullin Richter & Hampton LLP (57) ABSTRACT

Systems and methods are provided for implementing a secure computing system with encryption, including a file system with a set of encryption zones. Each encryption zone includes encrypted data files. The secure computing system also includes a set of encrypted data encryption keys, each of which corresponds to one of the encrypted data files, such that unencrypted versions of the encrypted data encryption keys decrypt the corresponding encrypted data files. Further, the secure computing system includes an encryption zone key for each of the encryption zones. Each of the encryption zone keys corresponds to at least one of the encrypted data encryption keys, such that the encryption zone keys decrypt the corresponding encrypted data encryption keys to generate the unencrypted version of the encrypted data encryption key. Thusly, various implementations of the secure computing system may comply with one or more information security standards for sensitive data.

16 Claims, 6 Drawing Sheets

(56) References Cited

U.S. PATENT DOCUMENTS

| | | | |
|---|---|---|---|
| 9,338,008 B1* | 5/2016 | Kirkland | H04L 9/3202 |
| 2008/0022361 A1 | 1/2008 | Bharadwaj et al. | |
| 2011/0261964 A1* | 10/2011 | Kahler | H04L 9/0825 |
| | | | 380/286 |
| 2012/0179909 A1* | 7/2012 | Sagi | H04L 63/045 |
| | | | 713/167 |
| 2013/0204948 A1* | 8/2013 | Zeyliger | G06F 9/44505 |
| | | | 709/206 |
| 2014/0010371 A1* | 1/2014 | Khazan | G06F 21/602 |
| | | | 380/278 |
| 2014/0317701 A1* | 10/2014 | Eicken | H04L 67/1097 |
| | | | 726/5 |
| 2014/0331297 A1* | 11/2014 | Innes | H04L 63/08 |
| | | | 726/7 |
| 2014/0372393 A1* | 12/2014 | Gosnell | G06F 17/30067 |
| | | | 707/698 |
| 2015/0026462 A1 | 1/2015 | Ramesh et al. | |
| 2015/0288664 A1* | 10/2015 | Murray | H04L 63/0435 |
| | | | 713/165 |
| 2015/0332291 A1* | 11/2015 | Gillooly | G06Q 20/20 |
| | | | 705/7.29 |
| 2015/0381592 A1* | 12/2015 | Khazan | G06F 21/602 |
| | | | 713/171 |
| 2016/0021101 A1* | 1/2016 | Balc'h | H04L 63/0823 |
| | | | 713/171 |
| 2016/0034475 A1* | 2/2016 | Manoochehri | G06F 17/30076 |
| | | | 707/756 |
| 2017/0323114 A1* | 11/2017 | Egorov | G06F 21/6218 |
| 2018/0145828 A1* | 5/2018 | Coon | H04L 63/08 |
| 2018/0152292 A1* | 5/2018 | Coon | H04L 63/08 |

* cited by examiner

FIG. 6

SECURE COMPUTER CLUSTER WITH ENCRYPTION

TECHNICAL FIELD

The present disclosure relates generally to data security. More particularly, the present disclosure is directed to systems, methods, and devices, for providing a secure computer cluster with encryption in computing environments that deal with sensitive information, and in some aspects is directed to secure computer clusters having encryption of at-rest and in-motion data and being compliant with one or more proprietary information security standards.

BACKGROUND

Data sets generated in computing applications—e.g., those used in business intelligence and other applications—have been growing in size and complexity for some time. At the same time, more and more data of a sensitive nature is communicated over networks and/or stored or computed/processed using remote servers. By way of example, the use of payment cards for a broad spectrum of cashless transactions has become ubiquitous in the current economy, accounting for hundreds of billions of dollars in transactions per year. MasterCard International Incorporated, one example of a payment card network operator, processes millions of transactions per hour across roughly 230 countries. Aspects involved with the use of payment cards typically include the authentication of the payor/consumer using the payment card, as well as the authorization of the transaction based upon the availability of monies in the payor's/consumer's bank account. During this cashless transaction process, a large amount of transaction data, some of which is considered sensitive financial data, is generated and collected, often rapidly. Other examples of environments or applications involving data with a high volume, variety, velocity of generation/processing/transport, variability, and complexity generally referred to as "big data"—include medical records, retail, government databases, and the like.

In these types of applications and others, in which sensitive information is generated, collected, processed, accessible to various clients, and so on, it may frequently be desirable for such data to be stored, transferred, processed, etc., in a secure system with secure protocols. One example of a security benchmark for such protocols exists in the payment card setting and is known as the Payment Card Industry ("PCI") Data Security Standard. The PCI Standard was created to increase controls and security protocols used in connection with cardholder information (e.g., to reduce credit card fraud). Other examples of security benchmarks and the like may include security requirements associated with the Health Insurance Portability and Accountability Act ("HIPAA"). Many government database and computing applications deal in sensitive information as well, and thus in various instances may be required to satisfy some minimum requirements related to security and encryption of data.

Nevertheless, traditional computing systems used in large-scale (e.g., big data) applications do not meet typical security protocols for, e.g., the above-mentioned types of applications. By way of illustration, HADOOP® networks have been designed and implemented to provide parallel computing for big data applications such as social media, other business intelligence applications, and the like, in which the data grows exponentially and tends to be difficult to timely (i.e., rapidly) collect in a structured manner. While the parallel, speedy, and scalable nature of HADOOP networks can be useful for aggregating and organizing large data sets, these types of networks often lack sufficient security measures to be amenable to applications such as those described above, wherein sensitive data is at issue, thus requiring protection and security measures to be implemented. Because existing large-scale computing (e.g., HADOOP-like) networks designed for big-data applications do not provide for sufficient security and/or encryption capabilities, secure networks are currently implemented using architectures that are not ideal for big data and like applications.

SUMMARY

In view of the above shortcomings in conventional computing and database solutions, in computing networks (e.g., HADOOP environments or the like) that deal with sensitive information—and particularly in those implemented on large data sets and used in on-the fly actionable applications (e.g., big data or business intelligence)—there exists a need for providing some security and/or encryption techniques to aspects of the data storage, updating, access, and/or retrieval process. In particular, there exists a need for a scalable, fast, and highly parallel network that, on the one hand, is capable of gathering significant amounts of data (e.g., as generated in the payment transaction process) and yet, on the other hand, is also sufficiently secure to satisfy any market, regulatory, or other needs for data privacy, security, etc. In this connection, embodiments of the present disclosure include systems, methods, and devices, capable of providing encryption of data (e.g., at-rest and in-motion data), including, for example, in computing environments that deal with sensitive information and/or that comply with a proprietary information security standard.

Embodiments of the present disclosure include a secure computing system with at-rest and in-motion encryption. The system includes a file system that in turn includes a set of encryption zones. Each of the encryption zones includes encrypted files. The system also includes a set of encrypted data encryption keys. Each of the encrypted data encryption keys corresponds to one of the encrypted files. In this manner, unencrypted versions of the encrypted data encryption keys decrypt the corresponding encrypted files. Furthermore, the system includes an encryption zone key for each of the encryption zones. Each of the encryption zone keys corresponds to at least one of the encrypted data encryption keys, such that the encryption zone keys decrypt the corresponding encrypted data encryption keys to generate the unencrypted version of the encrypted data encryption key. In other embodiments, the secure computing system includes a node that is external to the file system, and that stores the encrypted data encryption keys. The secure computing system, in further embodiments, also includes a hardware security module that stores at least some of the encryption zone keys.

The secure computing system, in example implementations, includes a key management service that is coupled to the file system and that processes requests for one or more of the encryption zone keys. Further to this example implementation, the system may include a key server that is coupled to the key management service and that stores the encryption zone keys. The key management service is coupled to the file system using a first mutual secure sockets layer, and the key server is coupled to the key management service using a second mutual secure sockets layer. In another example deployment, the key management service is used for a first live mode, and the secure computing system further includes a duplicate key management service used for a first standby mode. Further to this deployment, the key server includes the following: (1) a key trustee server used for a second live mode; (2) a duplicate key trustee server used for a second standby mode; (3) a hardware security module used for a third live mode; and/or (4) a duplicate hardware security module used for a third standby mode.

In addition, the system may also include an active directory coupled to a computer cluster that utilizes the file system. The active directory may be coupled to the computer cluster using a third mutual secure sockets layer, such that the active directory provides a certificate to a client to enable the client to access the computer cluster via a fourth mutual secure sockets layer using the certificate. In another deployment, the computer cluster is a HADOOP cluster, and, by the use of the encryption zone keys, the encrypted data encryption keys, the first, second, third, and fourth mutual secure sockets layers, and by the use of permissions and authorizations, the HADOOP cluster is secure beyond what is required for compliance with the Payment Card Industry Data Security Standard.

Aspects of the present disclosure also include a method for storing and processing data in a HADOOP computer cluster. The method includes generating an encrypted file from a file using a data encryption key specific to the file. The method also includes storing the encrypted data file in an encryption zone within a file system of the HADOOP computer cluster. Additionally, the method includes generating an encrypted data encryption key from the data encryption key using an encryption zone key specific to the encryption zone. The method further includes storing the encrypted data encryption key in a node external to the file system.

In embodiments of the present disclosure, the method includes decrypting the encrypted data encryption key using the encryption zone key, thus generating the data encryption key; and decrypting the encrypted file using the data encryption key. The method may also include storing the encryption zone key in at least one of a key trustee server and a hardware security module; and rotating the encryption zone key based upon one or more of characteristics of the encryption zone and industry compliance standards. In one or more deployments, the method includes receiving, from a client, a request for access to the encrypted file; and sending, in response to the request, the encrypted file and the encryption zone key specific to the encryption zone that stores the encrypted file. Sending the encrypted file may be done using mutual SSL. Additionally, the method may include verifying the client has permission and is authorized to access the file as requested. Further embodiments may involve the method storing the data encryption key external to the HADOOP computer cluster.

The present disclosure, in some embodiments, includes a HADOOP cluster having a HADOOP distributed file system ("HDFS"). The HDFS is coupled respectively to HADOOP services and to a key server using mutual SSL. The HDFS also includes a set of encryption zones, each of which stores encrypted files. Moreover, the HADOOP cluster includes a node that in turn includes a set of encrypted data encryption keys, each of which is specific to one of the encrypted files. The HADOOP cluster also includes a key server with a set of encryption zone keys stored thereon. Each the encryption zone keys corresponds to one of the encryption zones. For each of the encryption zones, the corresponding encryption zone key decrypts the encrypted data encryption key specific to encrypted file stored in the encryption zone.

In example implementations of the HADOOP cluster, clients connect to the HADOOP cluster using mutual SSL. Furthermore, the HADOOP services may include one or more of an operating system, a data warehouse, an execution engine, a workflow scheduler, a query engine, an interface aggregator, and a search platform; and each of the HADOOP services may be mutual SSL enabled. The encrypted files, in one embodiment, include cardholder data and/or medical records data. Additionally, in example deployments, the key server is coupled to the HDFS using mutual SSL; and the key server receives proxied client requests for access to the encryption zone keys stored on the key server.

BRIEF DESCRIPTION OF THE DRAWINGS

Further aspects of the present disclosure will be more readily appreciated upon review of the detailed description of the various disclosed embodiments, described below, when taken in conjunction with the accompanying figures.

The figures are described in greater detail in the description and examples below, are provided for purposes of illustration only, and merely depict typical or example embodiments of the disclosure. The figures are not intended to be exhaustive or to limit the disclosure to the precise form disclosed. It should also be understood that the disclosure may be practiced with modification or alteration, and that the disclosure may be limited only by the claims and the equivalents thereof.

DETAILED DESCRIPTION

Embodiments of the present disclosure are directed to systems, methods, and devices, capable of providing a secure computer cluster with encryption, e.g., of at-rest and in-motion data, and including, for example, in computing environments such as payment and other networks that deal with sensitive information and that may be subject to industry security standards and/or protocols. The details of some example embodiments of the systems, methods, and devices of the present disclosure are set forth in the description below. Other features, objects, and advantages of the disclosure will be apparent to one of skill in the art upon examination of the present description, figures, examples, and claims. It is intended that all such additional systems, methods, features, and advantages be included within this description, be within the scope of the present disclosure, and be protected by one or more of the accompanying claims.

The present disclosure includes computing networks (e.g., HADOOP environments or the like) that deal with sensitive information. Some embodiments includes such computer networks implemented on large data sets and used in on-the fly actionable applications (e.g., big data), and such computer networks that provide security and/or encryption techniques to data storing, updating, accessing, and retrieval processes. Thus, in accordance with embodiments of the present disclosure, whether the sensitive data is in-motion or at-rest, the data may be protected, for example, at least by the combination of layered encryption keys being applied and/or using mutual SSL for transmitting data within the network/computer system or externally therefrom. In further cases, authorization and permissions verifications are also implemented to provide additional layers of security.

Figure 1:
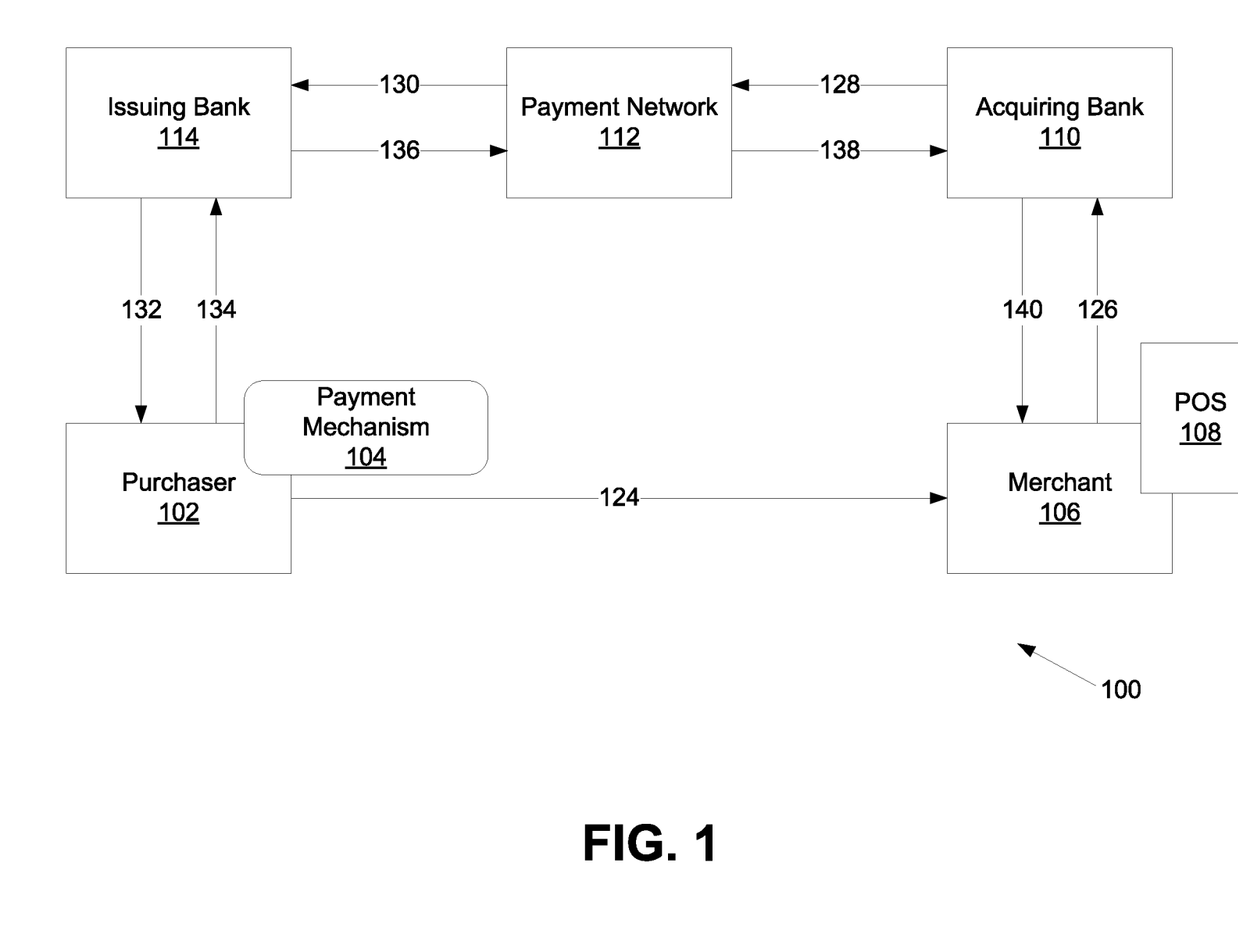
FIG. 1 illustrates an example payment card transaction processing system provided in connection with implementations of various embodiments of the disclosure.

As instances of the present disclosure relate to electronic transaction processing and data generated and collected thereby, the following description provides relevant context for various embodiments described herein. For example, FIG. 1 depicts example payment card transaction processing system 100, which may operate in connection with embodiments of the disclosed systems, methods, and devices. Transaction processing of card-based payments, including electronic payments, may include both an authorization side and a clearing side. System 100 depicts both the authorization side and the clearing side of card-based payment transactions.

The authorization side may involve the process of confirming that a cardholder (or purchaser) has a sufficient line of credit to cover a proposed payment for an item. The clearing side of the transaction may involve reconciliation between an issuing bank (of a payment card) 114 and an acquiring (or merchant) bank 110—e.g., determining the amount owed by issuing bank 114 to acquiring bank 110 or vice versa. Later on, funds may be exchanged between issuing bank 114 and acquiring/merchant bank 110, typically based on the clearing process.

In a typical card-based payment system transaction (or purchase transaction), purchaser 102 presents payment mechanism 104, which in various embodiments is a credit/debit/prepaid card, to merchant 106 for the purchase of an item. This purchase transaction is indicated by arrow 124. The item may be a good and/or a service. "Payment mechanism" 104 or "payment card," as used herein, may also refer to a conventional magnetic-stripe credit or debit card, or similar proximity payment device (utilized on its own or incorporated into another device such as a mobile telephone, personal digital assistant (PDA), etc.) having near field communications (NFC) capabilities, such as a radio frequency identification (RFID) chip implemented therein. "Payment mechanism" 104 or "payment card" may also further refer to virtual or limited-use account numbers and electronic wallets and the like, such as may be used in online transactions.

It will be understood by those of ordinary skill in the art that, prior to the occurrence of such a transaction, purchaser 102 was issued payment mechanism 104 by issuing bank 122. Each payment mechanism 104 is typically associated with an account of purchaser 102, whether purchaser 102 is an individual or some other entity. Likewise, each transaction entered into using payment mechanism 104 is associated with the account. In this regard, for each purchase transaction, payment network 112 processes account transactions by associating each transaction with the corresponding account, as is described in detail below. Periodically, as payment network 112 collects and processes account transactions, the information associated with these transactions is stored and sorted so that it may be subsequently analyzed, dispersed, and the like, as desired.

Moreover, it will be understood that merchant 106 has established a relationship with acquiring bank 110, thereby allowing merchant 106 to receive payment mechanism 104 (e.g., credit/debit cards) as payment for items. That is, acquiring/merchant banks (e.g., 110) and issuing banks (e.g., 114) may participate in various payment networks, including, by way of example, payment network 112. One such payment network is operated by MasterCard International Incorporated, the assignee of the present disclosure.

Referring again to FIG. 1, after purchaser 102 presents payment mechanism 104 to merchant 106, merchant 106 may send a request message (indicated by arrow 126), which in some embodiments may be all or part of an authorization request, to acquiring bank 110 via point-of sale (POS) terminal 108 located at or otherwise controlled by merchant 106. In turn, acquiring bank 110 communicates with payment network 112 (indicated by arrow 128), and payment network 112 communicates with issuing bank 114 (indicated by arrow 130) to determine whether purchaser 102 is authorized to make transaction 124. Issuing bank 114 either approves or declines the authorization request and thereafter transmits a response back to merchant 106 (indicated by arrows 136, 138, and 140). Merchant 106 may then either complete or cancel purchase transaction 124, based upon the response to the request message.

If purchase transaction 124 is approved, the transaction amount associated therewith will be sent from issuing bank 114 through payment network 112 to acquiring bank 110. The transaction amount, minus certain fees, will thereafter be deposited within a bank account belonging to merchant 106, in accordance with a process called settlement. Issuing bank 114 thereafter bills purchaser 102 (indicated by arrow 132) for all purchase transactions conducted over a given period of time by sending a statement to purchaser 102. Purchaser 102 responds by submission of payment(s) (as indicated by arrow 134) to issuing bank 114. This submission of payment(s) (as indicated by arrow 134) by purchaser 102 may be automated (e.g., in the case of debit transactions), may be initiated by purchaser 102 for the exact amount matching amounts of purchases during the statement period (e.g., charge cards or credit balances paid in full), and/or may be submitted (in part or in whole) over a period of time that thereby reflects the amount of the purchases, plus any financing charges agreed upon beforehand between purchaser 102 and issuing bank 114 (e.g., revolving credit balances).

Payment network 112 may include at least one of each of the following: storage, servers, and mainframes (none of which are shown in FIG. 1, but each of which will be appreciated by one of skill in the art upon studying the present disclosure). The mainframes may include a processing device and may be configured to implement the authorization and clearing process, with such configuration and/or associated instructions being stored in the storage and through various network connections to respective counterpart computer systems at issuing bank 114 and acquiring bank 110. The storage may include computer-readable-media storage technologies, such as a floppy drive, hard drive, tape drive, flash drive, optical drive, read-only memory (ROM), random access memory (RAM), and/or the like. The servers and the storage may be controlled by software/hardware and may store data and/or instructions to allow the mainframes to operate in accordance with aspects of the present disclosure. POS terminal 108 is in data communication, directly or indirectly, and at least from time to time, with, e.g., an acquirer host computer (not shown) that is part of payment network 112, and that is operated for or on behalf of acquiring bank 110, which handles payment card transactions for merchant 106. The server may be operated by or on behalf of the payment network 112, and may provide central switching and message routing functions among the member financial institutions of payment network 112. Issuing bank 114 also may make use of an issuer host computer (not shown), and an access point (not shown), via which the issuer host computer exchanges data messages with the server.

It should be noted that, in practice, payment card transaction processing system 100 may involve a number of cardholders/purchasers 102, POS terminals 108, merchants 106, acquirer host computers, issuer host computers, and access points, as well as a number of respective acquiring and issuing banks 110 and 114. In general, the acquirer host computer may receive authorization requests from POS terminals 108, forward the authorization requests through payment network 112, receive authorization responses, and relay the authorization responses back to POS terminal 108. Moreover, the issuer host computer may, in general, receive authorization requests from the servers and transmit authorization responses back to the server based on the authorization requests.

Also included in a typical card-based payment system transaction are the clearing and settlement processes described above. Clearing (which may happen after transmission of the authorization response if approved) may refer to a process by which issuing bank 114 exchanges transaction information with acquiring bank 110 (also referred to as merchant bank). Referring again to FIG. 1, acquiring bank 110 may transmit transaction information to payment network 112, which may include a clearing system (not shown in FIG. 1). The clearing system may validate the transaction information and forward it to issuing bank 114, which prepares data to be included on a payment statement for purchaser 102. The clearing system 114 may then provide reconciliation data to both issuing bank 114 and acquiring bank 110.

Settlement may refer to a process by which issuing bank 114 exchanges the requisite funds with acquiring bank 110 to complete an approved transaction. In particular, acquiring bank 110 may send clearing data in a clearing message to payment network 112, whereupon payment network 112 calculates a net settlement position and sends advisement to acquiring bank 110 and issuing bank 114. Issuing bank 114 may remit payment to payment network 112, which then sends the payment to acquiring bank 110. Acquiring bank 110 then pays merchant 106 for the purchase made by purchaser 102, and issuing bank 114 bills purchaser 102.

Having provided this context for payment card transaction processing system 100, specific embodiments of the present disclosure will now be described. It will be noted at this juncture, however, that one of skill in the art will recognize, upon studying the present disclosure, that system 100 merely represents one way in which large (and in some instances, sensitive) data sets are generated and/or processed, and that system 100 may be modified to represent other environments in which such data sets are generated, such as in the medical records, retail, government, and other contexts. Such modifications are within the scope of the present disclosure. Further, as will be understood by one of skill in the art, the above-described processing of transactions typically involves a significant amount of data being generated, stored, and transferred, for example using payment network 112. In this regard, payment card transaction processing systems, such as system 100, typically utilize database capabilities within or in conjunction with payment network 112 to store, sort, and analyze transaction data associated with the transactions processed through system 100. As described above, however, these capabilities have not previously been realized using HADOOP and other like networks, as such solutions lack the often-requisite security/encryption measures (e.g., to comply with security protocols). So it is in the healthcare and other industries, though such systems may use a modified version of payment network 112 to gather/process the subject data.

Figure 2:
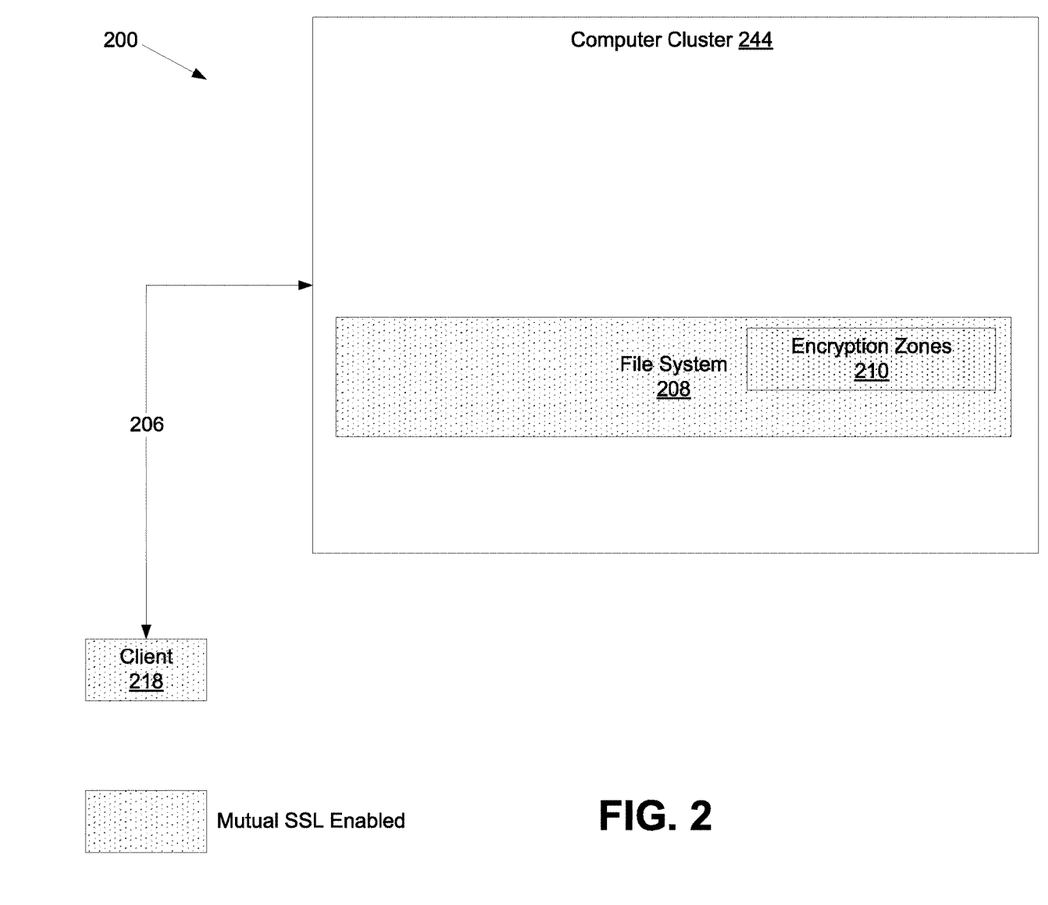
FIG. 2 illustrates an example computing system in which various embodiments of the disclosure may be implemented.

Turning now to FIG. 2, some embodiments of secure computing system 200 with at-rest and/or in-motion encryption are depicted. As alluded to previously, the present disclosure relates to providing encryption of data, including at-rest and in-motion data, and including, for example, in computing environments that deal with sensitive information and large data sets. Further, these data sets may be generated in connection with a payment network that processes transactions, for example, according to the above-described scenario. One such system is depicted in secure computing system 200. Moreover, aspects of system 200 may be used in conjunction with various methods disclosed herein, for example, for providing encryption of at-rest and in-motion data, for storing and processing data in a PCI-compliant HADOOP computer cluster, other big-data or business intelligence computing cluster, and the like, as will be described below. Nevertheless, as mentioned above, system 200 may be used in various contexts other than payment networks—for example, to provide at-rest and in-motion encryption for medical records data, retail data (e.g., that includes financial-related data of purchasers), data in a government database, or any other big-data computing network dealing with sensitive data.

Referring again to FIG. 2, example secure computing system 200 is depicted. Secure computing system 200 may be used to implement the above-mentioned layered key and encrypted communication protocols in order to protect sensitive data stored and processed by system 200—e.g., by business intelligence clients or the like that wish to access computer cluster 244 and various data stored in connection therewith (e.g., to run jobs on computer cluster 244). As shown, system 200 includes computer cluster 244 and client 218. In one embodiment, payment network 112 may be implemented at least in part using computing system 200.

As generally set forth above with reference to FIG. 1, payment network 112 collects and processes account transactions, typically a large number of such transactions. These account transactions, in various embodiments, originate with one or more of POS terminals 108.1-*n*. Given the large number of account transactions potentially stored, sorted, organized, and tracked by payment network 112, payment network 112 typically maintains a significant database of information related to the account transactions. For example, this database of information, which in whole or in part may be referred to herein as one or more data sets, or more simply, data (or information), may include such account-transaction-related information as the timing, purchase amount, frequency, general category, and location of purchases made, as well as information about items purchased. Typically, these data sets may be included in transactions files, wherein each transaction file is associated with an account of a purchaser 102. Thus, any of this information may generally be stored and processed in computing system 200.

In accordance with embodiments of secure computing system 200, examples of security techniques, and the associated hardware and architectures, will be described that may achieve at-rest or in-motion encryption, or a combination of the two. In various implementations, these techniques include the use of layered encryption keys for encryption of at-rest data, and/or the use of mutual secure sockets layers ("SSL") for encryption of in-motion data. Generally, the keys described herein may be used to scramble underlying data. Some example implementations of keys described herein may include 256-bit keys. The use of the disclosed layered key technique and/or the mutual SSL in big data computing environments may render such environments amenable to various of the above-described applications in which sensitive data is at issue—e.g., payment networks, retail, medical records, etc., that may be subject to information security standards. Before describing the detail of these security techniques, additional description of some of the example hardware for the computing environment is provided, as follows.

As shown in FIG. 2, computing system 200 may include computer cluster 244 and client 218. Client 218 may be a user or entity external to computer cluster 244, or may be internal to computer cluster 244, but in any case, for security purposes, the nature and extent to which client 218 is allowed to access particular data stored in computer cluster 244, may typically be limited and/or controlled. In particular, client 218 typically attempts to access computer cluster 244 in order to, for example, submit jobs thereto or kill jobs thereon, process or access data stored thereon, and receiver results therefrom.

In this regard, client 218 may be a big data client, or a business intelligence client, e.g., that wishes to run business intelligence tools and/or other applications through computer cluster 244, or to otherwise access data stored in system 200, and thus that would benefit from accessing computer cluster 244. Client 218 may, in various examples, be a Hadoop API (application programming interface) client, may be any application, may use an enterprise ID to connect to computer cluster 244, and/or may be an end user (e.g., an individual human) using a computer. Client 218 may be coupled to computer cluster 244 (e.g., via connection 206), such that client 218 may access computer cluster 244. By way of example, client 218 may access computer cluster 244 under automated instruction, or directly by a human user of computer.

Computer cluster 244 may be part of or may function in conjunction with one or more of the above-described mainframes that may be present in payment network 112, or that may be present in other types of computing networks used for big data and/or business intelligence applications. Alternatively, computer cluster 244 may itself include one or more mainframes (see, e.g., mainframe 332 in FIG. 3).

As illustrated in FIG. 2, in one embodiment, system 200 includes file system 208, which in turn includes a set of one or more encryption zones 210. Each encryption zone 210 includes encrypted data files—in other words, within each encryption zone 210 are encrypted data files. The encrypted data files may be any type of data file, but may include, in the payment network example, account transaction files associated with cardholder transactions. In other examples, the data files may include other types of data (e.g., medical records data), but in general, the data files may include any type of data.

In addition to file system 208, computer cluster 244 includes a set of encrypted data encryption keys. Each of the encrypted data encryption keys correspond to one of the encrypted data files stored in an encryption zone 210. In this regard, an encrypted data file may be decrypted using the decrypted (or unencrypted) version of the corresponding encrypted data encryption key. For security reasons, however, the unencrypted data encryption key, in various embodiments, is not stored on file system 208, nor is the unencrypted data encryption key typically passed between the various elements of computer cluster 244 or externally therefrom (e.g., to client 218). In this manner, for example, unauthorized access to file system 208 will not result in exposure of the unencrypted data encryption key needed to decrypt the encrypted files in encryption zones 210. Accordingly, the use of encrypted data encryption keys introduces a layered approach to encryption security.

System 200 also includes an encryption zone key for each encryption zone 210. Each of the encryption zone keys corresponds to at least one of the encrypted data encryption keys. In this manner, an encryption zone key may be used to decrypt the corresponding encrypted data encryption key. Subsequently, as mentioned above, the unencrypted (or decrypted) version of the encrypted data encryption key may be used to decrypt the corresponding encrypted file. Accordingly, the use of encryption zone keys in conjunction with encrypted data encryption keys may further the layered approach to encryption security.

In one example scenario, client 218 requests from computer cluster 244 access to an encrypted file stored in encryption zone 210. Assuming client 218 has the requisite permissions and/or authorization required for this request (as will be described in further detail with respect to FIG. 3), computer cluster 244 sends client 218 the encrypted file and the corresponding encryption zone key. Client 218 then decrypts the encrypted file using the encryption zone key and a local copy of the encrypted data encryption key, as described above. As illustrated in this example, the encrypted file and the encryption zone key are passed across the connection (e.g., connection 206) to client 218, while the encrypted data encryption key is not. This may limit unwanted/unauthorized access to the encrypted data encryption key, and may provide for increased security for the encrypted file.

Using the above-described multi-layer key encryption may thus provide security for sensitive data stored in computer cluster 244. In accordance with embodiments described herein, such sensitive data is accessible only to clients 218 having the corresponding zone encryption key and encrypted data encryption key. Unauthorized clients 218 that do not hold the proper keys will be unable to access the encrypted files stored in encryption zones 210. Accordingly, as mentioned above, this multi-layer key encryption may be used to protect sensitive data stored in system 200.

Figure 3:
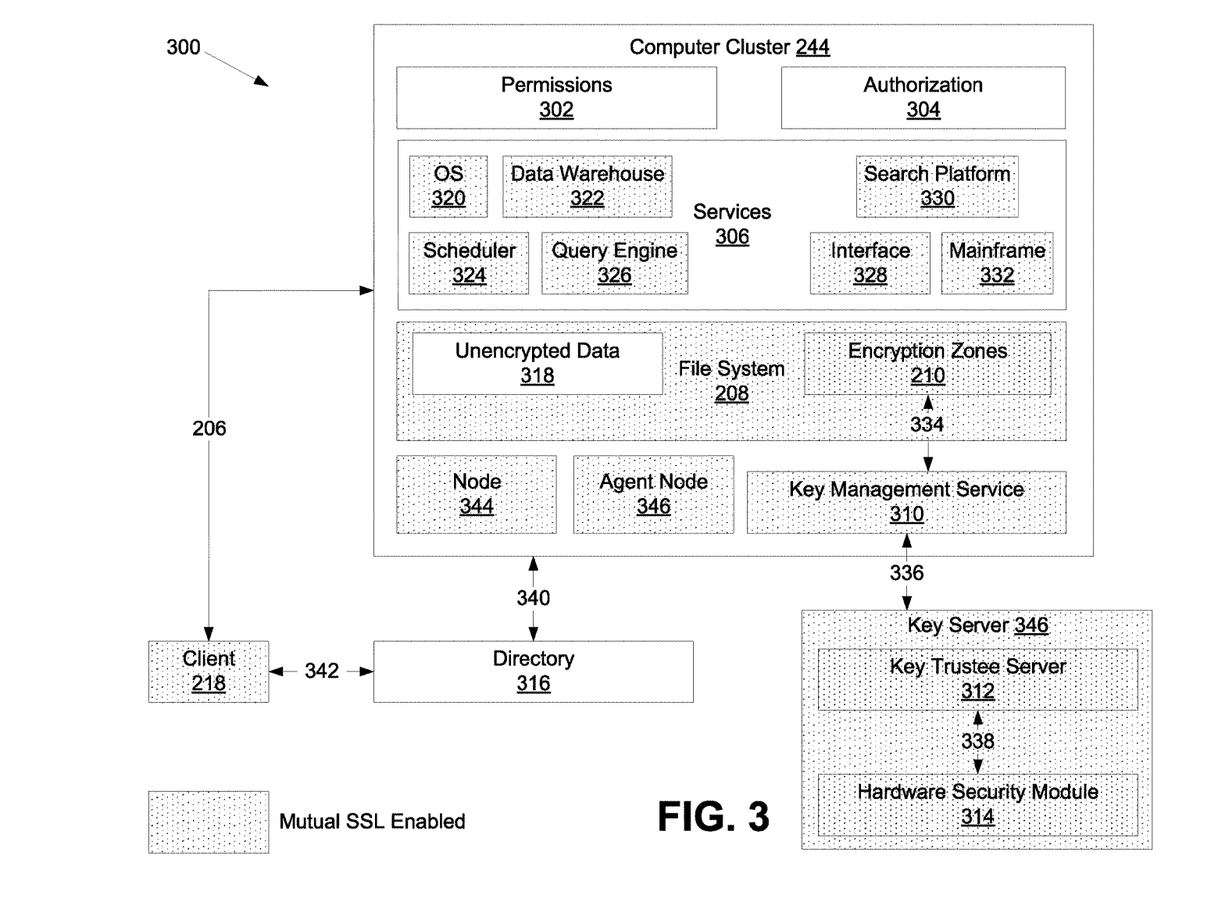
FIG. 3 illustrates another example computing system in which various embodiments of the disclosure may be implemented.

FIG. 3 depicts embodiments of secure computing system 300 with at-rest and/or in-motion encryption. In various of the embodiments shown in FIG. 3, system 300 may be substantially similar to system 200. As shown, however, one embodiment of system 300 includes key management service 310 and key server 346. Key management service 310 may be coupled to file system 208 and key server 346. Key management service 310 processes requests (e.g., from client 218) for one or more of the encryption zone keys that may be stored in key server 346. For example, key management service 310 may proxy requests from client 218 to key server 346, thus providing an extra layer of security around files stored in system 300 (e.g., because client 218 does not have direct access to key server 246). In additional embodiments, key server 346 is implemented using key trustee server 312, or a combination of key trustee server 312 and hardware security module 314, which may be integrated into the back-end of system 300.

If both key trustee server 312 and hardware security module 314 are present in system 300, key trustee server 312 and hardware security module 314 together may provide redundant key service for file system 208. For example, if one of key trustee server 312 or hardware security module 314 fails, the other may be utilized as a backup. Likewise, in some example embodiments, key management service 310 may be made redundant as well. In such examples, system 300 includes a duplicate key management service (not shown, but, e.g., key management service 310), a duplicate key trustee server (not shown, but, e.g., key trustee server 312), and/or a duplicate hardware security module (not shown, but, e.g., hardware security module 314). Moreover, key management service 310 may be used for a first live mode, and the duplicate key management service may be used for a first standby mode; key trustee server 312 may be used for a second live mode and the duplicate key trustee server may be used for a second standby mode; and hardware security module 314 may be used for a third live mode, and the duplicate hardware security module may be used for a third standby mode.

In some embodiments, key management service 310 resides within or is part of computer cluster 244. In other embodiments, however, key management service 310 may be external to computer cluster 244. Further, as shown, key server 346 may be external to computer cluster 244, but may in other instances be internal thereto. As mentioned some instances of the present disclosure may include hardware security module 314, which may alternatively or additionally store various keys described herein, including, e.g., encryption zone keys. Although hardware security module 314 is shown as being part of key server 346, in some example embodiments, hardware security module 314 may be external to key server 346.

System 300, in example implementations, includes node 344, which may be external to file system 208. In some instances, e.g., if computer cluster 244 is a HADOOP cluster, node 344 may be a master node and may, for example, by implemented as a NameNode. The encrypted data encryption keys may be stored on node 344. Node 344 may be part of or accessible by computer cluster 244, but typically is not accessible to client 218. In this manner, client 218 will not have unfettered access to the encrypted data encryption keys stored on computer cluster 244. Node 344 may also have access to one or more agent nodes 346 that may run underlying jobs distributed or delegated by node 344. Node 344 may also be a service node, and in some cases, there may be multiple nodes 344 included in computer cluster 244.

As mentioned above, in addition to multiple layers of encryption using encryption keys, in-motion data may be encrypted using mutual secure sockets layers ("SSL") for security purposes. For example, system 300 may engage in various types of internal and/or external communications (e.g., including TCP/IP, RPC, HTTP, HTTPS, and the like), and any or all such communications may be encrypted at the mutual SSL level. Such communications or connections (e.g., as may at times be represented as arrows), such as connections 206, 334, 336, 338, 340, and/or 342, in FIGS. 2 and 3) may be over a wire, wireless, and so on, as will be apparent to one of skill in the art upon studying the present disclosure. System 300 provides examples of how this may be done, as will be described below and with further reference to FIG. 3. It will be noted that in FIGS. 2 and 3, one or more of the elements of systems 200 and 300 that are shown as filled with a dotted pattern fill may be mutual SSL enabled. It will also be appreciated by one of ordinary skill in the art upon studying the present disclosure, that various elements may be connected to one another whether or not arrows are explicitly shown. For example, mutual SSL may be used to connect various services 306 to one another, to connect services 306 to file system 208 (including the sub-elements of service 306 and/or file system 208), and to connect services 306 and/or file system 208 to any node 344, agent node 346, key management service 310, and key server 346, and vice versa.

In one example embodiment, key management service 310 is coupled to file system 208 using first mutual SSL connection 334; and key server 346 is coupled to key management service 310 using second mutual SSL connection 336. In this embodiment, the first and second mutual SSL connections 334, 336 provide an additional security measure that protects the encryption zone keys and encrypted files as they are passed to/from and/or within computer cluster 244. Key management service 310 is typically not exposed to client 218, thus providing a security buffer between client 218 and encryption zone keys that may be stored in key server 346. Further, by using the various mutual SSL encrypted connections described herein, wire sniffing may be prevented. For example, the keys described herein are typically not be transferred over the wire (or wireless link, for example) without being encrypted, and decryption of these keys may require the proper certificate, in addition to the above-described keys. Additionally, and as mentioned above, in various embodiments, communications between, e.g., services 306 and file system 208, or other blocks included in system 300, may be done using mutual SSL, such that each party will need the proper certificate to receive the communication properly. In this regard, some implementations of key management service 310 may provide the advantage in that key management service 310 receives requests using different protocols, but then may use only a single protocol to communicate with key server 346. This may simplify the tasks required of key server 346, in addition to providing additional security, as mentioned above.

System 300, in another example embodiment, includes directory 316. Client 218 may be coupled to directory 316 (e.g., via connection 342). Directory 316 may in turn be coupled to computer cluster 244 (e.g., via connection 340) using third mutual SSL connection 340. Connection 342 need not be mutual SSL encrypted (though in some instances, connection 342 is mutual SSL encrypted)—for example, client 218 may access directory 316 over connection 342 in order to get a secure identification in a secure manner but using a non-secure network connection. Accordingly, directory 316 may provide a certificate to enable client 218 to access computer cluster 244 via fourth mutual SSL connection 206. In one embodiment, directory 216 may be an active directory (e.g., Kerberos KDS, or the like) that, as mentioned, issues one or more tickets to client 218 so that client 218 may obtain the ticket in a secure manner over a non-secure network connection (e.g., by connection 342) and ultimately access computer cluster 244 using the ticket. In this manner, directory 316 may implement a network authentication protocol to restrict access to computer cluster 244 to only authorized clients 218 (e.g., those clients 218 having the proper ticket).

In a further example embodiment, computer cluster 244 is a Hadoop cluster compliant with the Payment Card Industry Data Security Standard (e.g., at least by the use of permissions 302 and/or authorizations 304), and by the use of the encryption zone keys, the encrypted data encryption keys, and/or first, second, third, and/or fourth mutual SSL connections (e.g., 334, 336, 340, 206), the Hadoop cluster may be secure beyond what is required for PCI compliance. In this example embodiment, as shown in FIG. 3, computer cluster 244 may additionally include one or more of permissions 302, authorization 304, and services 306. Client 218 may use services 306 to access data (e.g., in file system 208) in various manners (e.g., submit/kill various jobs and the like), provided that client 218 meets the permissions and authorizations set by permissions 302 and authorization 304, respectively.

Permissions 302 may include an access control list ("ACL") in order to, for example, determine which clients 218 may access different services 306 (e.g., by submitting jobs to computer cluster 244, or to an operating system therein, or by killing the jobs). Authorization 304 may provide a second layer of security by implementing role-based authorization related to the access client 218 has to data or files stored on file system 208 (whether or not these files are encrypted). For example, authorization 304 may specify which types of data or files in file system 208 are accessible to client 218. Thus, the combination of permissions 302 and authorization 304 determines, for example, what jobs or types of jobs client 218 may submit for particular data or files. As mentioned, this may be true whether the data is stored in encryption zones 210 or as unencrypted data 318. Here, it is noted that file system 208 may also include unencrypted data 318—e.g., in some cases, storing data in unencrypted format may be a default mode of operation. Generally, however, sensitive information may be stored in the form of encrypted files in encryption zones 210, whereas other information may be stored as unencrypted data 318.

In various embodiments, services 306 may include one or more services, such as operating system 320, data warehouse 322, scheduler 324, query engine 326, interface 328, search platform 330, and mainframe 332. In example implementations, computer cluster 244 is a HADOOP cluster. In such implementations, operating system 320 may be a YARN (Yet Another Resource Negotiator) operating system, data warehouse 322 may be a HIVE data warehouse (and related infrastructure) and/or execution engine, scheduler 324 may be an Oozie workflow scheduler, query engine 326 may be an IMPALA query engine, interface 328 may be a HUE user interface or web interface aggregator, and search platform 330 may be a SOLR search platform (or some other real-time indexing and/or text search capable server). Collectively, services 306 provide client 318 with the ability to access and manipulate data stored on computer cluster 244 (e.g., on file system 208) in different ways, including by providing an interface for doing so.

An addition embodiment of the present disclosure involves a PCI-compliant HADOOP cluster (e.g., computer cluster 244). The PCI-Compliant HADOOP cluster includes HADOOP services (including, e.g., services 306), a key management system (including, e.g., key management service 310 and/or key server 346), and a HADOOP distributed file system ("HDFS") (e.g., file system 208). It will be noted here that the HDFS may be considered a service itself, and thus, any description herein related to services may in some instances apply to the HDFS as well. In one embodiment, and similar to the description above, the HADOOP services include one or more of an operating system, a data warehouse, an execution engine, a workflow scheduler, a query engine, an interface aggregator, and a search platform.

The key management system may proxy requests for one or more encryption zone keys—e.g., from a user (such as client 218) to key server 346, where the encryption zone keys may be stored. As explained above, the encryption zone keys may be used to generate encrypted data encryption keys, or to decrypt the same in order to decrypt an encrypted file. In one embodiment, the key management system includes key management service 310 and key server 346, and both of these are mutual SSL enabled and coupled to the HDFS using mutual SSL. In one example, the HDFS is coupled respectively to the HADOOP services using mutual SSL. Further, the HDFS includes a set of encryption zones that each store a set of encrypted files. Encrypted data encryption keys corresponding to the encrypted files may be stored in node 244. As mentioned previously, the encrypted files may, by way of example, be cardholder data or medical records data. In one example implementation of the PCI-compliant HADOOP cluster, clients 218 connect to the HADOOP cluster using mutual SSL (e.g., by connection 206).

Figure 4:
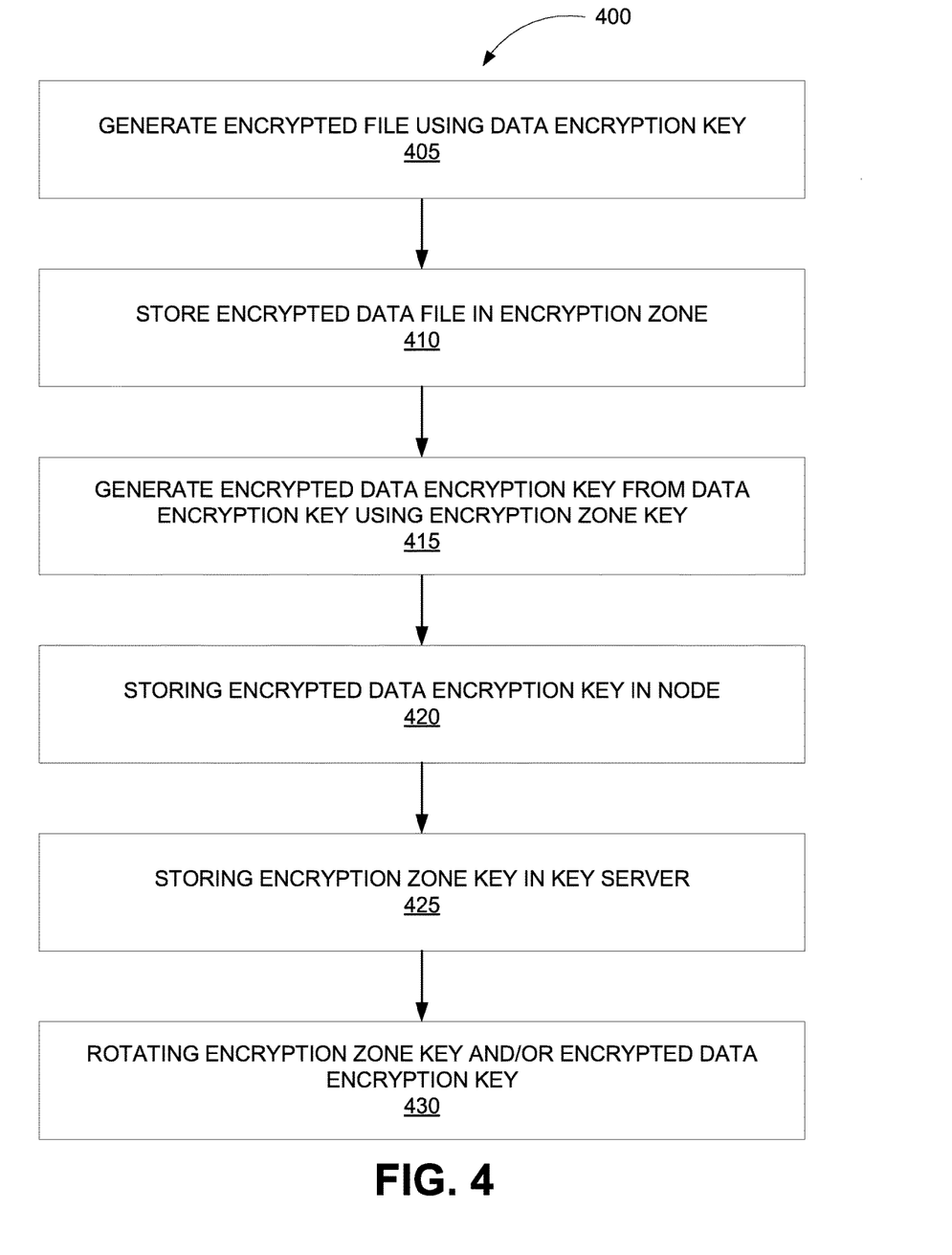
FIG. 4 is an example flow diagram illustrating various operations that may be performed to store and process data in accordance with various embodiments of the disclosure.

FIG. 4 illustrates a flow chart depicting various operations of method 400 and accompanying embodiments for storing and processing data, for example, in a PCI-compliant HADOOP computer cluster (e.g., some embodiments of computer cluster 244), in accordance with the present disclosure. The operations of method 400 may be carried out, in some cases, by one or more of the components/elements of systems 100, 200, and 300 described above and referenced in FIGS. 1, 2, and 3. In such instances, the description of method 400 may refer to the corresponding component/element, but in any case, one of skill in the art will recognize when the corresponding component/element may be used, whether or not there is explicit reference thereto. Further, it will be appreciated that such references does not necessarily limit method 400 to the particular component/element referred to. Thus, it will be appreciated by one of skill in the art that aspects and features described above in connection with systems 100, 200, and 300, and elements therein, including variations thereof, may be applied to the various operations described in connection with method 400.

Generally, method 400 facilitates encrypted storage and processing of data, including in-motion and at-rest data. By way of example, a PCI-compliant HADOOP network may be realized by carrying out various of the operations of method 400. In particular, the operations of method 400 and various example implementations of the same involve utilizing multiple layers of key encryption, and/or mutual SSL connections, to encrypt and secure sensitive data, such as payment card information, but also including any type of sensitive data besides payment card information. Referring again to FIG. 4, at operation 405, method 400 entails generating an encrypted file from a file using a data encryption key specific to the file. The file, and in turn the encrypted file may contain PCI subject to security protocols. As such, operation 405 may serve to provide a layer of encryption security. At operation 410, method 400 involves storing the encrypted data file in an encryption zone (e.g., encryption zone 210) within a file system (e.g., file system 208, which may be an HDFS).

At operation 415, method 400 includes generating an encrypted data encryption key from the data encryption key using an encryption zone key specific to the encryption zone. Additionally, the encryption zone key is stored external to file system 208. At operation 420, method 400 involves storing the encrypted data encryption key in a node (e.g., node 344) external to the file system. With the encrypted data encryption key stored externally from the file system, clients (e.g., client 218) may be unable to access the encrypted data encryption keys, notwithstanding that the clients may be able to access the file system. This provides additional security because, without the encrypted data encryption key, the client will be unable to decrypt any of the encrypted files stored in the file system. As described above, the encrypted data encryption key is typically not transferred over connection 206, but is something the client typically is, if the client is authorized, assumed to have in order to access the encrypted files. Thus, using encrypted data encryption keys may represent an additional layer of encryption security, particularly in situations wherein the encrypted data encryption keys are not passed over connection 206 and are not accessible to the clients (i.e., are stored in a node such as node 244 external to file system 208).

One embodiment of method 400 includes, at operation 425, storing the encryption zone key in at least one of a key server (e.g., key server 346, key trustee server 312, or a combination of key trustee server 312 and hardware security module 314). At operation 430, method 400 may include rotating the encryption zone key based upon characteristics of the encryption zone (e.g., type or nature of encrypted files stored therein, type of clients that access the encryption zone, and so on), and/or based upon industry compliance standards. For example, particular encryption zones may employ key rotation with higher frequencies if the encryption zones are relatively sensitive in terms of the types of data stored therein and/or jobs available to the data, and so on. Likewise, for example, industry standards (e.g., the PCI Data Security Standard) may require that key be rotated with prescribed frequencies and/or in prescribed manners. Generally speaking, key rotation may be applied to any keys described herein, and may be based on the characteristics of the file, the key to be rotated, the encryption zone, permissions or authorizations related to the file and/or client, or any applicable industry standards (e.g., the PCI Data Security Standard). In some instances, however, the data encryption key itself is not rotated—rather, the encryption zone key may be rotated, thus rotating any encrypted data encryption keys encrypted using the encryption zone key being rotated.

Figure 5:
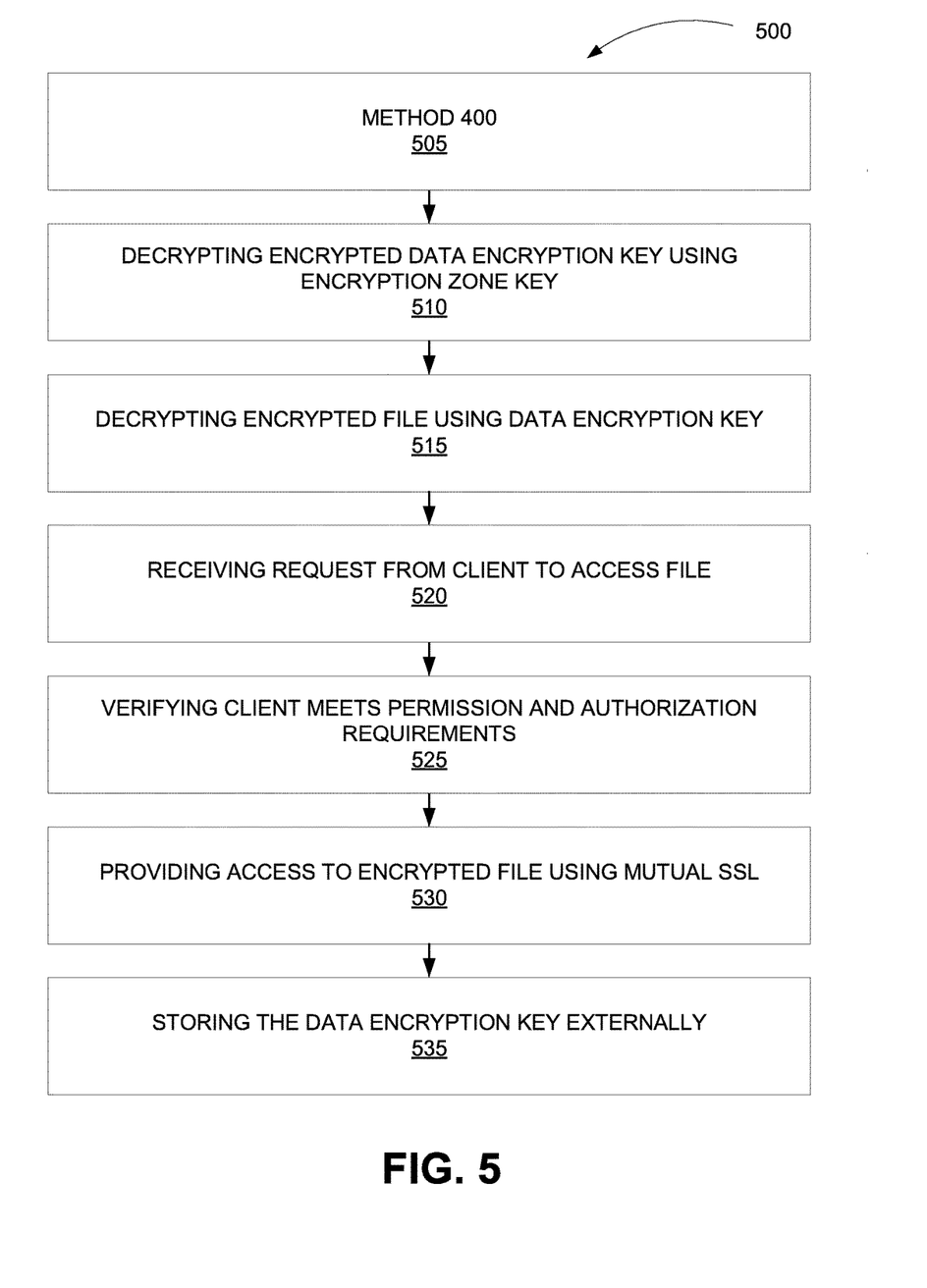
FIG. 5 is an example flow diagram illustrating various operations that may be performed to store and process data in accordance with additional embodiments of the disclosure.

FIG. 5 illustrates a flow chart describing various operations of method 500 that may be performed in order facilitate storing, processing, and accessing data, for example, in a PCI-compliant HADOOP computer cluster (e.g., some embodiments of computer cluster 244), in accordance with the present disclosure. Method 500 may be carried out by one or more components/elements of systems 100, 200, and 300, and may, for instance, include one or more operations of method 400 (e.g., at operation 505). In such instances, the description of method 500 may refer to the corresponding component/element, but in any case, one of skill in the art will recognize when the corresponding component/element may be used to carry out various operations of method 500, whether or not there is explicit reference to these components/elements. As with method 400, references to components/elements described in FIGS. 1, 2, and 3 are for purposes of illustration only and do not necessarily limit method 500 to the particular component/element referenced. Likewise, it will be appreciated by one of skill in the art that aspects and features described above in connection with systems 100, 200, and 300, and elements therein, including variations thereof, may be applied to the various operations described in connection with method 500.

Referring again to FIG. 5, method 500 includes among other operations, several operations that, for example, ultimately result in decrypting an encrypted file. As shown, one embodiment of method 500 includes operation 510, which involves decrypting the encrypted data encryption key using the encryption zone key. Decrypting the encrypted data encryption key generates the underlying, unencrypted version of the data encryption key (e.g., this may represent removing a layer of encryption security). Further to this embodiment, operation 515 entails decrypting the encrypted file using the data encryption key (e.g., this may represent removing another layer of encryption security). Operation 515 results in obtaining the file in the file's unencrypted form.

In another example embodiment of method 500, at operation 520, method 500 includes receiving a request from a client (e.g., client 218) for access to at least one of files. As mentioned above, this access may involve running a job on the file and producing an output file that may subsequently be returned to the client, may involve retrieving the file itself (in its encrypted form), and so on. At operation 525, method 500 includes verifying that the client meets the permissions and authorization requirements applicable to the request. For example, as mentioned above, the permissions (e.g., permissions 302) may take the form of an access control list that specifies for a particular client, a specific list of jobs that the client may submit or kill (where the client may not be able to submit/kill any unlisted jobs). Alternatively, or in addition, the permission may indicate that the client may not submit or kill jobs at all. Further, the authorization (e.g., authorization 304) may specify what types of data, or may specific files, that the client may access. In short, the verification performed at operation 525 provides additional layers of security between the client and the encrypted files.

At operation 530, method 500 includes providing, in response to the request, the client with access to the encrypted file. For example, this may involve sending the encrypted file and the encryption zone key to the client using mutual SSL (e.g., by connection 206). Alternatively, or in addition, providing access to the file may include running a job on the file and providing an output back to the client, which output itself may take the form of another encrypted file. The encryption zone key sent to the client in this embodiment is specific to the encryption zone that stores the file to which access is requested. As mentioned above, the encryption zone key and the encrypted file are made accessible to the client, but the encrypted data encryption key is not made accessible to the client by way of the client's access to computer cluster 244. In this manner, the file is protected using additional layers of security encryption.

In another embodiment, method 500 includes, at operation 535, storing the data encryption key external to the PCI-compliant HADOOP computer cluster. While the encrypted data encryption key may be stored in a node (e.g., node 344) on the PCI-compliant HADOOP computer cluster, the data encryption key in this embodiment is stored externally to the cluster. In this manner, the data encryption key is protected from any client or any other entity or user having unauthorized access to the file system—e.g., because such clients generally will not be able to access the data encryption key simply by accessing the file system or the cluster. Rather, the clients will have to already be in possession of the data encryption key (e.g., by way of a controlled transaction). Thus, without the encrypted data encryption key and the encryption zone key, unauthorized clients, users, etc. will not be able to decrypt encrypted files.

Figure 6:
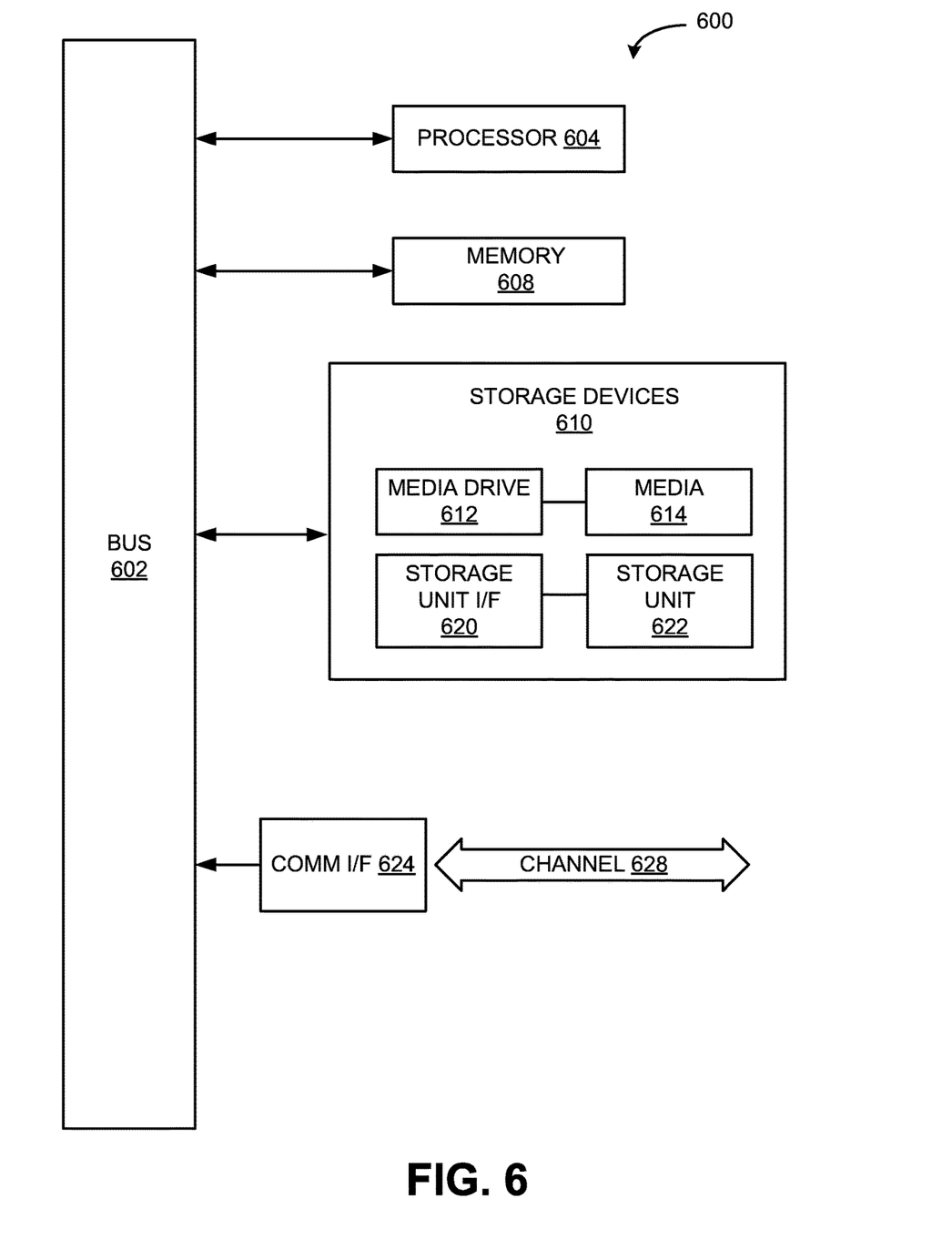
FIG. 6 illustrates an example computing module that may be used to implement features of various embodiments of the disclosure.

FIG. 6 illustrates example computing module 600, which may in some instances include a processor/controller resident on a computer system (e.g., computer cluster 244), for example, in the form of a mainframe, or a processor/controller used to execute computational functions in computer cluster 244. Computing module 600 may be used to implement various features and/or functionality of embodiments of the systems and methods disclosed herein. In one embodiment of the disclosure, computing module 600 includes a non-transitory computer-readable medium having computer-executable code embodied thereon. The computer-executable code is configured to cause a computer system (e.g., computer cluster 244), e.g., in a payment network to implement various of the above-described security techniques.

With regard to the above-described embodiments of computing module 600, one of skill in the art will appreciate additional variations and details regarding the functionality of the embodiments, as set forth herein in the context of systems and method described with reference to FIGS. 1, 2, 3, 4, and 5. For example, it will be appreciated that the computer-executable code described herein may be augmented in various embodiments to include some of the functionalities and features described above with respect to systems 100, 200, and 300, and methods 400 and 500. In this connection, it will also be appreciated by one of skill in the art that features and aspects of the various embodiments (e.g., systems) described herein may be implemented with respected to other embodiments (e.g., methods) described herein without departing from the spirit of the disclosure.

As used herein, the term module might describe a given unit of functionality that may be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described may be shared in part or in total among one or more modules. In other words, as would be apparent to one of ordinary skill in the art after reading this description, the various features and functionality described herein may be implemented in any given application and may be implemented in one or more separate or shared modules in various combinations and permutations. Even though various features or elements of functionality may be individually described or claimed as separate modules, one of ordinary skill in the art will understand that these features and functionality may be shared among one or more common software and hardware elements, and such description shall not require or imply that separate hardware or software components are used to implement such features or functionality.

Where components or modules of the application are implemented in whole or in part using software, in one embodiment, these software elements may be implemented to operate with a computing or processing module capable of carrying out the functionality described with respect thereto. One such example computing module is shown in FIG. 6. Various embodiments are described in terms of example computing module 600. After reading this description, it will become apparent to a person skilled in the relevant art how to implement the application using other computing modules or architectures.

Referring now to FIG. 6, computing module 600 may represent, for example, computing or processing capabilities found within mainframes, supercomputers, workstations or servers; desktop, laptop, notebook, or tablet computers; hand-held computing devices (tablets, PDA's, smartphones, cell phones, palmtops, etc.); or the like, depending on the application and/or environment for which computing module 600 is specifically purposed.

Computing module 600 may include, for example, one or more processors, controllers, control modules, or other processing devices, such as a processor 604. Processor 604 might be implemented using a special-purpose processing engine such as, for example, a microprocessor, controller, or other control logic. In the illustrated example, processor 604 is connected to bus 602, although any communication medium may be used to facilitate interaction with other components of computing module 600 or to communicate externally.

Computing module 600 may also include one or more memory modules, simply referred to herein as main memory 608. For example, random access memory (RAM) or other dynamic memory may be used for storing information and instructions to be executed by processor 604. Main memory 608 may also be used for storing temporary variables or other intermediate information during execution of instructions to be executed by processor 604. Computing module 600 may likewise include a read only memory ("ROM") or other static storage device coupled to bus 602 for storing static information and instructions for processor 604.

Computing module 600 may also include one or more various forms of information storage devices 610, which may include, for example, media drive 612 and storage unit interface 620. Media drive 612 may include a drive or other mechanism to support fixed or removable storage media 614. For example, a hard disk drive, a floppy disk drive, a magnetic tape drive, an optical disk drive, a CD or DVD drive (R or RW), or other removable or fixed media drive may be provided. Accordingly, removable storage media 614 may include, for example, a hard disk, a floppy disk, magnetic tape, cartridge, optical disk, a CD or DVD, or other fixed or removable medium that is read by, written to or accessed by media drive 612. As these examples illustrate, removable storage media 614 may include a computer usable storage medium having stored therein computer software or data.

In alternative embodiments, information storage devices 610 may include other similar instrumentalities for allowing computer programs or other instructions or data to be loaded into computing module 600. Such instrumentalities may include, for example, fixed or removable storage unit 622 and storage unit interface 620. Examples of such removable storage units 622 and storage unit interfaces 620 may include a program cartridge and cartridge interface, a removable memory (for example, a flash memory or other removable memory module) and memory slot, a PCMCIA slot and card, and other fixed or removable storage units 622 and storage unit interfaces 620 that allow software and data to be transferred from removable storage unit 622 to computing module 600.

Computing module 600 may also include a communications interface 624. Communications interface 624 might be used to allow software and data to be transferred between computing module 600 and external devices. Examples of communications interface 624 include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 may typically be carried on signals, which may be electronic, electromagnetic (which includes optical) or other signals capable of being exchanged by a given communications interface 624. These signals may be provided to communications interface 624 via channel 628. Channel 628 may carry signals and may be implemented using a wired or wireless communication medium. Some non-limiting examples of channel 628 include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, main memory 608, storage unit interface 620, removable storage media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions may enable the computing module 600 to perform features or functions of the present application as discussed herein.

Various embodiments have been described with reference to specific example features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various example embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the present application, whether or not such embodiments are described and whether or not such features are presented as being a part of a described embodiment. Thus, the breadth and scope of the present application should not be limited by any of the above-described example embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide illustrative instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed in multiple groupings or packages or across multiple locations.

Additionally, the various embodiments set forth herein are described in terms of example block diagrams, flow charts, and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

What is claimed is:

1. A secure computing system with at-rest and in-motion encryption, the system comprising a computer cluster, the computer cluster comprising:
   at least one device processor;
   at least one memory unit implemented in hardware and operatively connected to the at least one device processor, the at least one memory unit comprising computer code adapted to cause the at least one device processor to effectuate:
      a file system comprising a set of encryption zones, each of the encryption zones comprising encrypted files, wherein the encrypted files comprise account transaction files associated with cardholder transactions;
      a set of encrypted data encryption keys, each of the encrypted data encryption keys corresponding to one of the encrypted files, such that unencrypted versions of the encrypted data encryption keys decrypt the corresponding encrypted files;
      an encryption zone key for each of the encryption zones, each of the encryption zone keys corresponding to at least one of the encrypted data encryption keys, such that the encryption zone keys decrypt the corresponding encrypted data encryption keys to generate the unencrypted version of the encrypted data encryption key;
      large data set storage platform services to provide a client access to data in at least one of the encrypted files stored in the file system, the large data set storage platform services comprising one or more of:
         a data warehouse;
         an execution engine;
         a workflow scheduler;
         a query engine;
         an interface aggregator;
         a search platform; and
         a mainframe; and
      a key management service that is coupled to the file system using a first mutual secure sockets layer and that processes requests for one or more of the encryption zone keys;
   a physical, computerized master node to store the set of encrypted data encryption keys, wherein the physical, computerized master node is external to the file system and is implemented locally within, and as part of, the computer cluster; and one or more physical, computerized agent nodes accessible by the physical, computerized master node to run underlying jobs as delegated by the physical, computerized master node.

2. The secure computing system of claim 1, further comprising a physical, computerized key server that is coupled to the key management service and that stores the encryption zone keys.

3. The secure computing system of claim 2, wherein the physical, computerized key server is coupled to the key management service using a second mutual secure sockets layer.

4. The secure computing system of claim 3, further comprising a physical, computerized active directory coupled to a computer cluster that utilizes the file system, wherein the active directory is coupled to the computer cluster using a third mutual secure sockets layer, such that the active directory provides a certificate to a client to enable the client to access the computer cluster via a fourth mutual secure sockets layer using the certificate.

5. The secure computing system of claim 4, wherein the computer cluster is a large data set storage platform cluster.

6. The secure computing system of claim 2, wherein:
the key management service is used for a first live mode;
the secure computing system further comprises a duplicate key management service used for a first standby mode; and
the key server comprises:
a key trustee server used for a second live mode;
a duplicate key trustee server used for a second standby mode;
a hardware security module used for a third live mode; and
a duplicate hardware security module used for a third standby mode.

7. The secure computing system of claim 1, further comprising a hardware security module that stores at least some of the encryption zone keys.

8. A method for storing and processing data in a large data set storage platform cluster, the method comprising:
generating an encrypted file from a file using a data encryption key specific to the file, wherein the file comprises account transaction data associated with at least one cardholder transaction;
storing the encrypted data file in an encryption zone within a file system of the large data set storage platform cluster;
generating an encrypted data encryption key from the data encryption key using an encryption zone key specific to the encryption zone;
storing the encrypted data encryption key in a master node external to the file system, wherein the master node is implemented locally within, and as part of, the large data set storage platform cluster;
the master node delegating underlying jobs to one or more agent nodes within the large data set storage platform cluster; and
storing the encryption zone key in a hardware security module.

9. The method of claim 8, further comprising:
decrypting the encrypted data encryption key using the encryption zone key, thus generating the data encryption key; and
decrypting the encrypted file using the data encryption key.

10. The method of claim 8, further comprising:
rotating the encryption zone key based upon one or more of characteristics of the encryption zone and industry compliance standards.

11. The method of claim 8, further comprising:
receiving, from a client, a request for access to the encrypted file; and
sending, in response to the request, the encrypted file and the encryption zone key specific to the encryption zone that stores the encrypted file, wherein sending the encrypted file is done using mutual SSL.

12. The method of claim 11, further comprising verifying the client has permission and is authorized to access the file as requested.

13. A large data set storage platform cluster, comprising:
a distributed file system coupled respectively to large data set storage platform services and to a key server using mutual SSL, the distributed file system comprising a set of encryption zones, wherein each of the encryption zones stores encrypted files, the encrypted files comprising account transaction files associated with cardholder transactions;
a physical, computerized master node to store a set of encrypted data encryption keys, each of which is specific to one of the encrypted files, wherein the master node is external to the distributed file system and is implemented locally within, and as part of, the large data set storage platform cluster;
one or more physical, computerized agent nodes accessible by the physical, computerized master node to run underlying jobs as delegated by the physical, computerized master node; and
a key server with a set of encryption zone keys stored thereon, each of the encryption zone keys corresponding to one of the encryption zones, wherein, for each of the encryption zones, the corresponding encryption zone key decrypts the encrypted data encryption key specific to encrypted file stored in the encryption zone.

14. The large data set storage platform cluster of claim 13, wherein clients connect to the large data set storage platform cluster using mutual SSL.

15. The large data set storage platform cluster of claim 13, wherein:
the large data set storage platform services comprise one or more of an operating system, a data warehouse, an execution engine, a workflow scheduler, a query engine, an interface aggregator, and a search platform; and
each of the large data set storage platform services is mutual SSL enabled.

16. The large data set storage platform cluster of claim 13, wherein:
the key server is coupled to the distributed file system using mutual SSL; and
the key server receives proxied client requests for access to the encryption zone keys stored on the key server.

* * * * *